United States Patent [19]
Takeuchi

[11] Patent Number: 5,842,533
[45] Date of Patent: Dec. 1, 1998

[54] MULTI-LEGGED WALKING APPARATUS

[75] Inventor: Hiroki Takeuchi, Tsukuba, Japan

[73] Assignee: Agency of Industrial Science and Technology, Ministry of International Trade and Industry, Tokyo, Japan

[21] Appl. No.: 663,665

[22] Filed: Jun. 14, 1996

[51] Int. Cl.⁶ .................................................. B62D 57/02
[52] U.S. Cl. .......................................... 180/8.1; 180/8.6
[58] Field of Search ............................. 180/8.1, 8.5, 8.6, 180/8.2

[56] References Cited

U.S. PATENT DOCUMENTS

| | | | |
|---|---|---|---|
| 4,203,423 | 5/1980 | Soto | 180/8.6 |
| 4,662,465 | 5/1987 | Stewart | 180/8.1 |
| 4,834,200 | 5/1989 | Kajita | 180/8.6 X |
| 5,121,805 | 6/1992 | Collie | 180/8.1 |
| 5,127,484 | 7/1992 | Bares et al. | 180/8.1 |

FOREIGN PATENT DOCUMENTS

| | | | |
|---|---|---|---|
| 139567 | 6/1986 | Japan | 180/8.6 |
| 251284 | 11/1987 | Japan | 180/8.1 |

*Primary Examiner*—Joseph D. Pape
*Attorney, Agent, or Firm*—Oblon, Spivak, McClelland, Maier & Neustadt, P.C.

[57] ABSTRACT

A multi-legged walking apparatus includes a first plurality of legs having a large weight support capacity and a second plurality of legs providing a large thrust force. The first plurality of legs provide a smaller thrust force than the thrust force of the second plurality of legs, and the second plurality of legs have a smaller weight support capacity than the weight support capacity of the first plurality of legs. The overall weight of the apparatus is supported substantially by the first plurality of legs, and the overall thrust of the apparatus is provided substantially by the second plurality of legs.

24 Claims, 5 Drawing Sheets

MULTI-LEGGED WALKING APPARATUS

BACKGROUND OF THE INVENTION

1. Field of the Invention:

The present invention relates to a multi-legged walking apparatus for a robot.

2. Description of the Prior Art:

Moving mechanisms developed for autonomous mobile robots include wheel systems, crawler systems, and leg systems. Multi-legged walking robots have been developed having two, three, four or six legs. A multi-legged walking apparatus having three or more legs walks by placing three or more legs on the ground to support the weight of the apparatus and swinging the other leg to another point on the ground. This alternating changeover from support leg to swing leg enables the weight of the apparatus to be supported as the apparatus moves in a walking motion. This walking by alternating changeover between support and swing legs is a relatively static motion.

Dynamic walking machines are also being developed in which a dynamic walking motion is achieved by utilizing movement resulting from swinging a leg forward. The multiple legs on such an apparatus have to have two functions: a support function to support the weight of the apparatus, and a forward thrust function by thrusting against the ground.

FIG. 9 shows a conventional multi-legged dynamic walking apparatus 51. In this apparatus, two front legs 53 and two back legs 54 are each attached to a frame 52 via a hip joint 56. Each of the legs 53 and 54 has a knee joint 55. The knee joints 55 all have the same structure, and allow the legs 53 and 54 to bend and straighten. The hip joints 56 and knee joints 55 are each provided with actuators arranged to support the weight of the apparatus and provide forward thrust. As the apparatus's center of gravity 21 is substantially at the center of the apparatus, the weight of the apparatus acts on all of the legs 53 and 54. This means that even when the apparatus is not in motion, the knee and hip drive actuators have to be in constant operation to enable the weight of the apparatus to be supported by the knee joints, and powerful actuators have to be used if the apparatus is a heavy one. When walking, horizontal forward thrust has to be generated while the apparatus is being supported by the legs, and this also has to be effected by using powerful knee and hip actuators. This means an increase in the weight of the actuators themselves.

An object of the present invention is to provide an efficient multi-legged walking apparatus in which optimum disassociation between the apparatus weight support function and the forward thrust function of legs is provided by allocating support functions to front legs and forward thrust functions to back legs, which reduces the amount of energy used by the apparatus and enables the size of the apparatus to be reduced, the number of actuators used to be decreased, and the maximum vehicle speed to be increased.

SUMMARY OF THE INVENTION

For attaining this object, the present invention provides a multi-legged walking apparatus comprising a first plurality of legs having a large weight support capacity and a second plurality of legs having a large thrust force, in which the first plurality of legs has a smaller thrust force than the thrust force of the second plurality of legs and the second plurality of legs has a smaller weight support capacity than the weight support capacity of the first plurality of legs, overall apparatus weight is supported substantially by the first plurality of legs and overall apparatus thrust is provided substantially by the second plurality of legs.

In accordance with this invention, there is a separation between the weight support function and thrust function required of the legs, with the weight of the apparatus being supported mainly by the front legs, and the thrust being provided by the back legs minimally affected by the overall weight of the apparatus. With this configuration, front leg knee actuators only need to be structurally capable of supporting the weight of the apparatus, and need virtually no ability to deliver forward thrust. As a result, those actuators can be low-output types having a simple structure. On the other hand, the joint actuators of back legs need virtually no apparatus weight support capability, and instead only need to be able to generate forward thrust by thrusting against the ground, so those actuators, too, can be low-output types having a simple construction.

Compared to conventional multi-legged walking apparatuses in which each leg had to deliver thrust while supporting the apparatus, the multi-legged walking apparatus of this invention uses energy more efficiently. In addition, since the invention uses fewer actuators, and the actuators it does use are smaller than those of a conventional apparatus, the actuators are lighter, so the overall apparatus is lighter, thereby enabling energy consumption to be reduced.

Further features of the invention, its nature and various advantages will be more apparent from the accompanying drawings and following detailed description of the invention.

DESCRIPTION OF THE PREFERRED EMBODIMENTS

Figure 1:
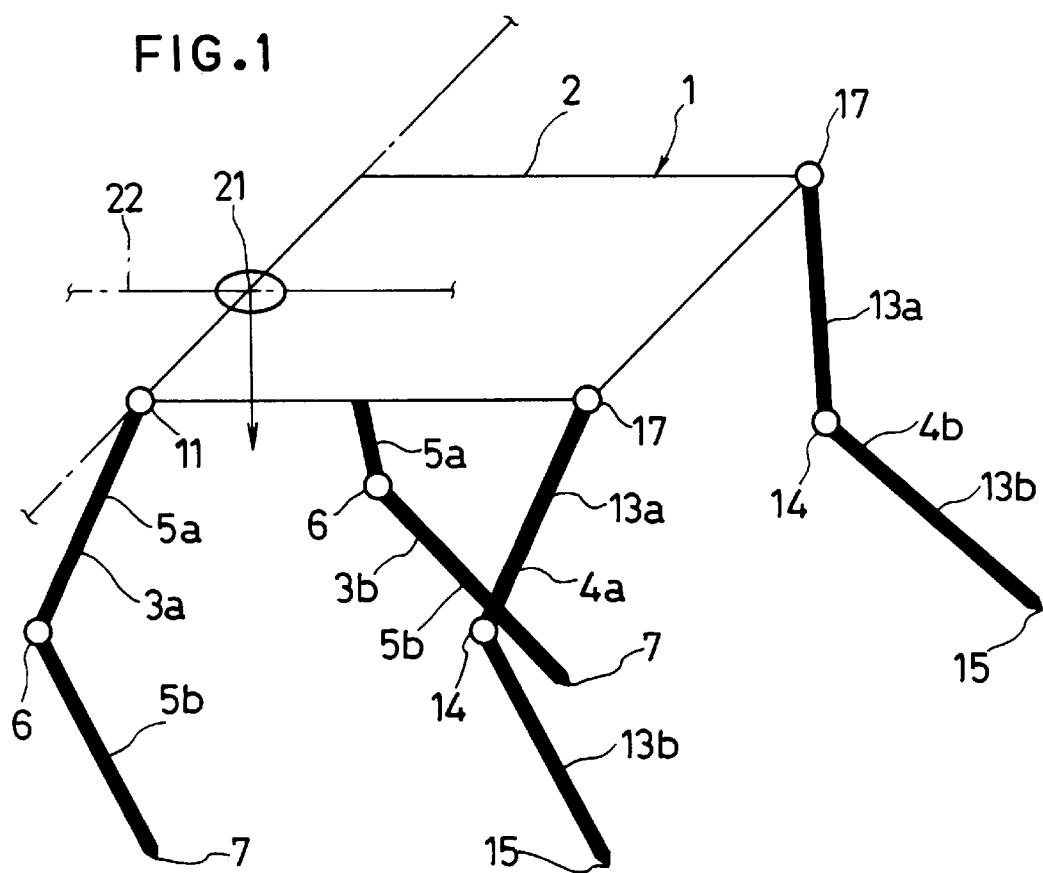
FIG. 1 is a perspective view showing an embodiment of the multi-legged walking apparatus of this invention.
Figure 2:
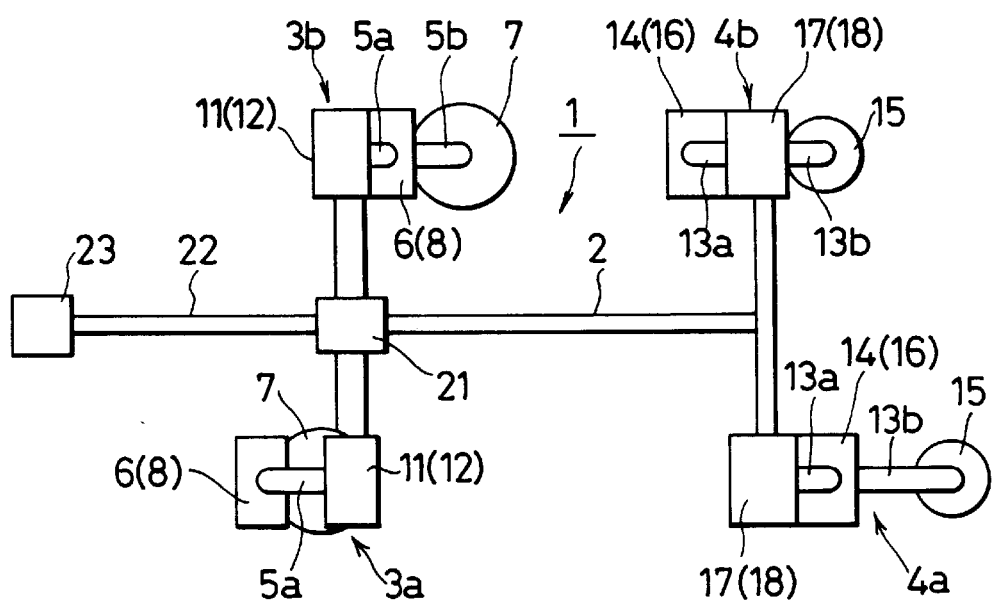
FIG. 2 is a plan view of the apparatus of FIG. 1.

A first embodiment of the multi-legged walking apparatus according to this invention will now be described with reference to FIGS. 1 to 3, which illustrate a multi-legged walking apparatus 1. The apparatus 1 has a frame 2. The frame 2 has two front legs 3a and 3b and two back legs 4a and 4b. The front legs 3a and 3b and back legs 4a and 4b are attached to the frame 2 by hip joints 11 and 17, respectively. The front legs 3a and 3b are each comprised of a rigid, rod-shaped upper link 5a, a rigid, rod-shaped lower link 5b, and a knee joint 6 that connects the links rotatably. The lower end of the lower link 5b has a ground contact member 7. The knee joint 6 is a rotary joint and is provided with a rotary actuator 8 with a brake to control the position of the knee joint 6. A hip joint 11 at the upper end of each of the front legs 3a and 3b has a rotary actuator 12 to control the position of the hip joint 11. The back legs 4a and 4b are each comprised of a rigid, rod-shaped upper link 13a, a rigid, rod-shaped lower link 13b, and a knee joint 14 that connects the links rotatably. The lower end of the lower link 13b has a ground contact member 7. The knee joint 14 is provided with a rotary actuator 16 to control the position of the knee joint 14. The hip joint 17 at the upper end of each of the back legs 4a and 4b has a rotary actuator 18 to control the position of the hip joint 17.

An important element of this walking apparatus is that its center of gravity 21 is positioned between and just or nearly just over the front legs 3a and 3b. When design or component device layout considerations make it impossible to locate the center of gravity 21 between and above the front legs 3a and 3b, the apparatus is configured by equipping the frame 2 with an extension portion 22 to which a counterbalance 23 is attached so that the addition of the weight of the counterbalance 23 results in the center of gravity 21 being located between and above the front legs 3a and 3b. Instead of the counterbalance 23, a work manipulator or the like can be used that has an equivalent mass. By adjusting the position of the balance-weight, the counterbalance can also be used to change the position of the center of gravity 21, as required. More specifically, when the walking apparatus is to be used to perform some task on uneven terrain, the apparatus can be put on hold and the position of the balance-weight adjusted to shift the center of gravity 21 to the center of the four legs to make the apparatus stable. Or, for optimum walking efficiency, the center of gravity 21 can be moved toward the front legs to increase the leg function share ratio. Were the center of gravity 21 to be moved fully forward to over the front legs, the back legs could be considered as constituting a manipulator to which a two-legged walking apparatus is attached, in which case the back legs could be used as a manipulator by suitably modifying the ends of the back legs.

With the apparatus 1 thus constituted, walking is effected by cooperative operation of the front legs 3a and 3b and back legs 4a and 4b. This is achieved by controlling the rotary actuators 8, 12, 16 and 18 of the knee joints 6 and 14 and hip joints 11 and 17. In the walking motion, the front legs 3a and 3b switch between support leg function and swing leg function, substantially supporting the weight of the apparatus 1 when in the support leg phase. The back legs 4a and 4b thrust the apparatus 1 forward by thrusting against the ground 24.

This will now be described more specifically with reference to FIGS. 2, 3 and 4. When the right front leg 3b is a support leg, as shown in FIG. 3, the knee joint 6 is locked by the brake mechanism, more or less forming upper link 5a and lower link 5b into a single rigid body supporting the weight of the apparatus 1. At this time, the rotary actuator 8 of the knee joint 6 is braked and not in operation. Thus, the front leg 3b is given a weight support function that allows the multi-legged walking apparatus to be supported without expending energy. The rotary actuator 8 is activated to raise the ground contact member 7 of the left front leg 3a, which is the swing leg, from the ground 24 with the knee joint 6 slightly bent, in which state the rotary actuator 12 of the hip joint 11 is activated to advance the leg forward. In the next operation the left front leg 3a becomes a support leg, links 5a and 5b are locked by the brake of rotary actuator 8 to form a single rigid leg, supporting the apparatus, while at the same time the right front leg 3b becomes the swing leg, lifting off the ground (FIG. 4).

Figure 3:
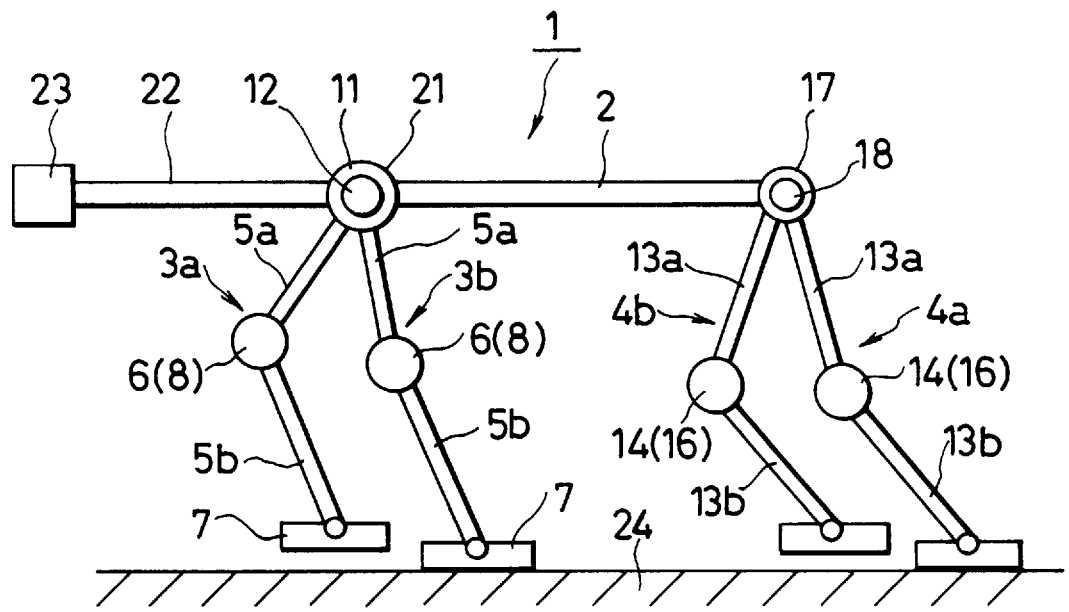
FIG. 3 is a side view of the apparatus of FIG. 1.
Figure 4:
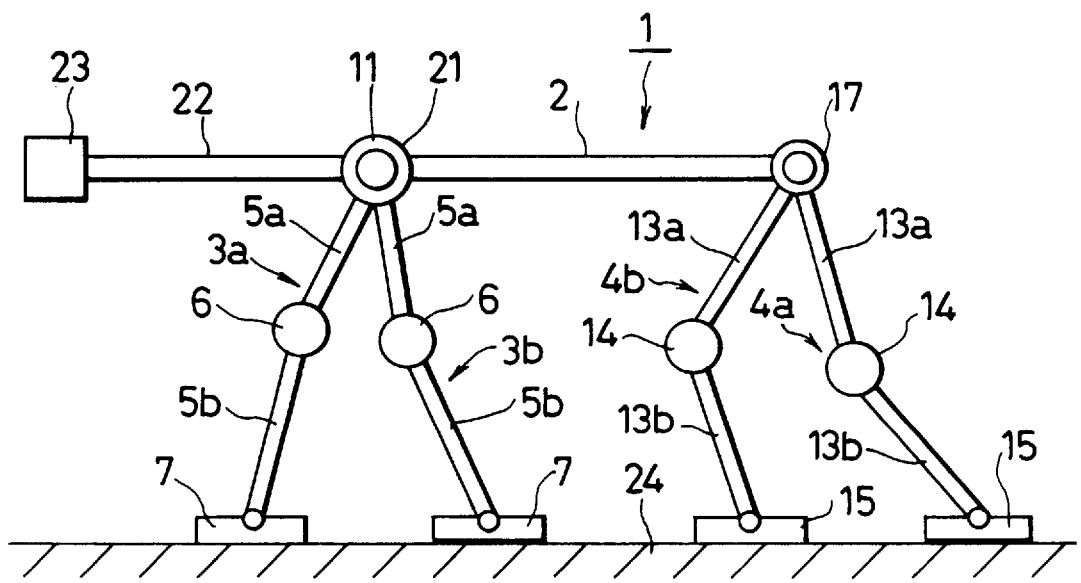
FIG. 4 is a side view of the apparatus of FIG. 1, showing the changeover period from support leg and thrust leg to swing leg.

When the right back leg 4a is the thrust leg, with its ground contact member 15 in contact with the ground the rotary actuators 16 and 18 of the knee joint 14 and hip joint 17 are activated to push the right back leg 4a against the ground 24, thereby imparting a forward thrust force to the apparatus 1 (FIG. 3). At this time, with the left back leg 4b becoming the swing leg, the ground contact member 15 rises from the ground 24 and the left back leg 4b is moved forward by activating the rotary actuators 16 and 18 of the knee joint 14 and hip joint 17. In the next operation the left back leg 4b moved forward is placed on the ground and changes to a thrust leg (FIG. 4). Walking is effected by repeating these actions. Since there is almost no weight acting on the back legs 4a and 4b, the knee joints 14 do not require the actuators to support the apparatus 1. Similarly, the actuators for weight support purposes or for generating a thrust force are not required on the front legs.

In the multi-legged walking apparatus 1 described above the center of gravity 21 is located above the space between the front legs 3a and 3b. However, when the legs along a mutually diagonal line are in a trot gait, with one pair of legs planted and the other pair of legs swinging, when viewed from the front, both the legs are in contact with the ground, but when the apparatus tilts toward the front leg that forms the swing leg, the front leg that is the swing leg changes to a support leg before the apparatus falls over, enabling the apparatus to keep on walking and not fall down. This operation can be effected with increased smoothness by the use of actuators for moving the center of gravity toward the support leg side when the apparatus tilts. For a pace gait in which both the back and front legs on the right side are raised at the same time while the back and front legs on the left side are both planted on the ground, since the apparatus is inclined toward the swing leg side, changeover between the support leg and the swing leg is required before the apparatus falls over; otherwise the center of gravity has to be constantly maintained over the front leg that becomes the support leg. Furthermore, in the apparatus according to the present invention, when a large thrust force is given to the two back legs to be thrust upwardly aslant, with the two front legs planted on the ground, the front legs are moved upward aslant and lift off the ground along with the apparatus in consequence of kicking the ground and immediately thereafter, when the front legs are made straightforward, the front legs and then the back legs will land on the ground. Thus, the present invention can attain a gallop gait in which both the front legs and the back legs lift off the ground at the same time.

Figure 5:
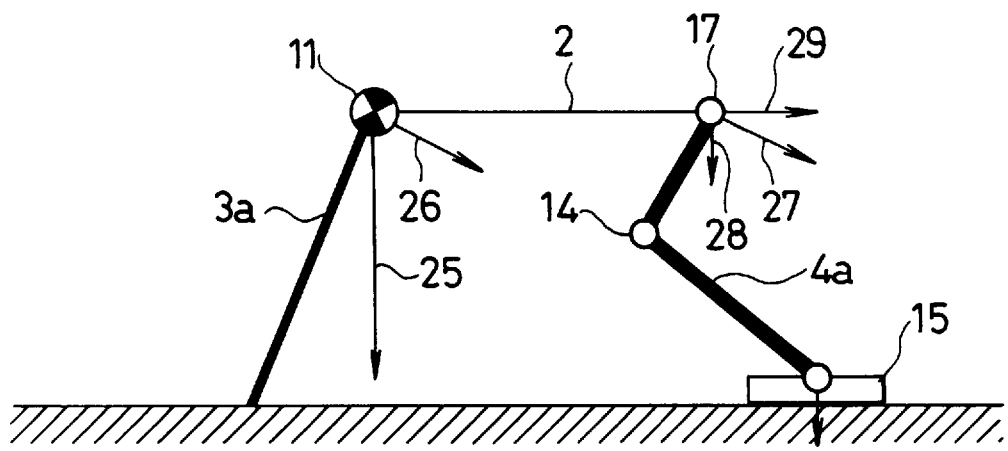
FIG. 5 illustrates the load distribution between the front and back legs of the apparatus of FIG. 1, when a front leg is swung to the front.

A certain degree of frictional force is needed between leg end ground in order to obtain forward thrust by the back legs. This frictional force can be obtained as follows. When the apparatus 1 is being thrust forward in a walking motion and the front leg 3a is planted to the front, as shown in FIG. 5, the load component of the front leg 3a acts at a downward angle to the back, as indicated by arrow 26, so the load component of the back leg 4a also acts at a downward angle to the back, as shown by arrow 27. This load component 27 can be divided into a horizontal load component 29 and a perpendicular load component 28. Part of the load component acting on the back leg 4a results in a frictional force between the back leg and the ground. Reference numeral 25 indicates the direction of gravitational force.

Figure 6:
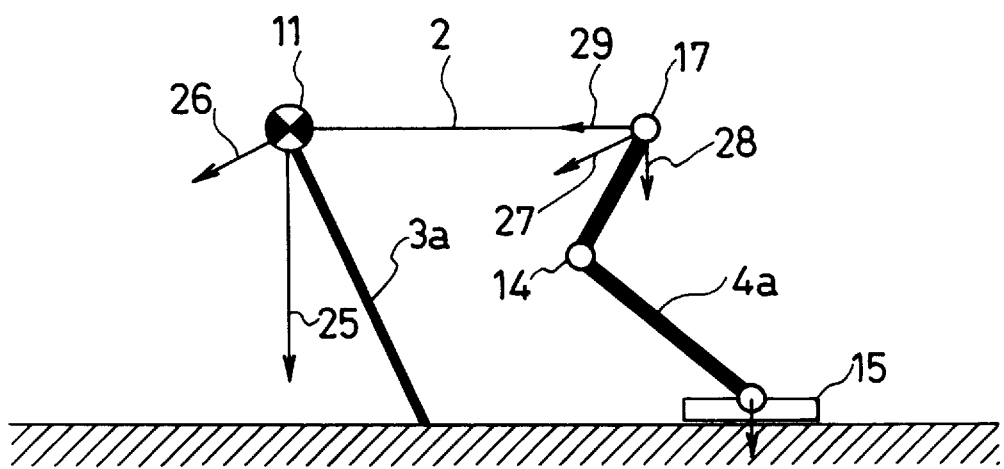
FIG. 6 illustrates the load distribution between the front and back legs of the apparatus of FIG. 1, when a front leg is swung to the back.

When the front leg 3a is planted to the back, as shown in FIG. 6, the load component of the front leg 3a acts at a forward downward angle shown by arrow 26, so the load component of the back leg 4a also acts at a forward downward angle shown by arrow 27. The load component 27 can be divided into a horizontal load component 29 and a perpendicular load component 28 that results in a frictional force between the back leg and the ground. The frictional force can be reduced to the minimum needed by adjusting the overall center of gravity in the vicinity of the front legs or by dynamically adjusting the counterbalance during walking motion.

Figure 7:
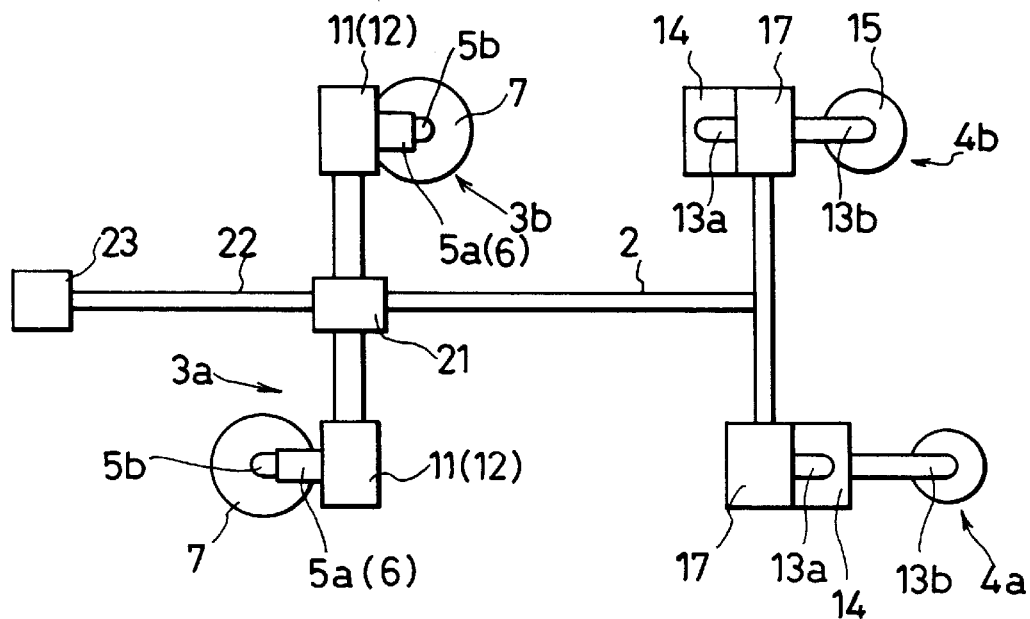
FIG. 7 is a plan view of a multi-legged walking apparatus according to another embodiment of the invention.
Figure 8:
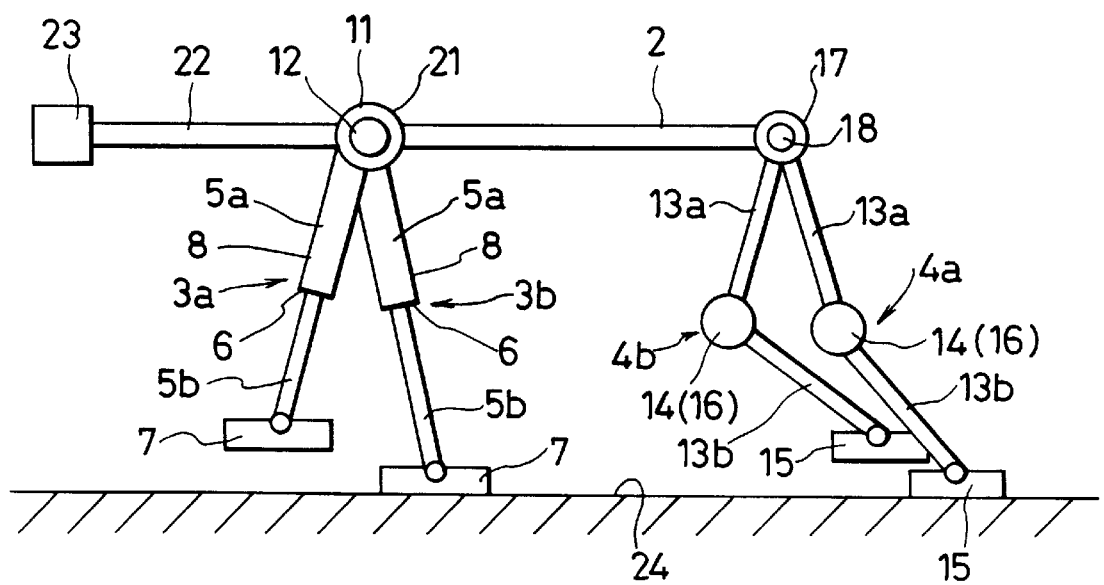
FIG. 8 is a side view of the apparatus of FIG. 7.
Figure 9:
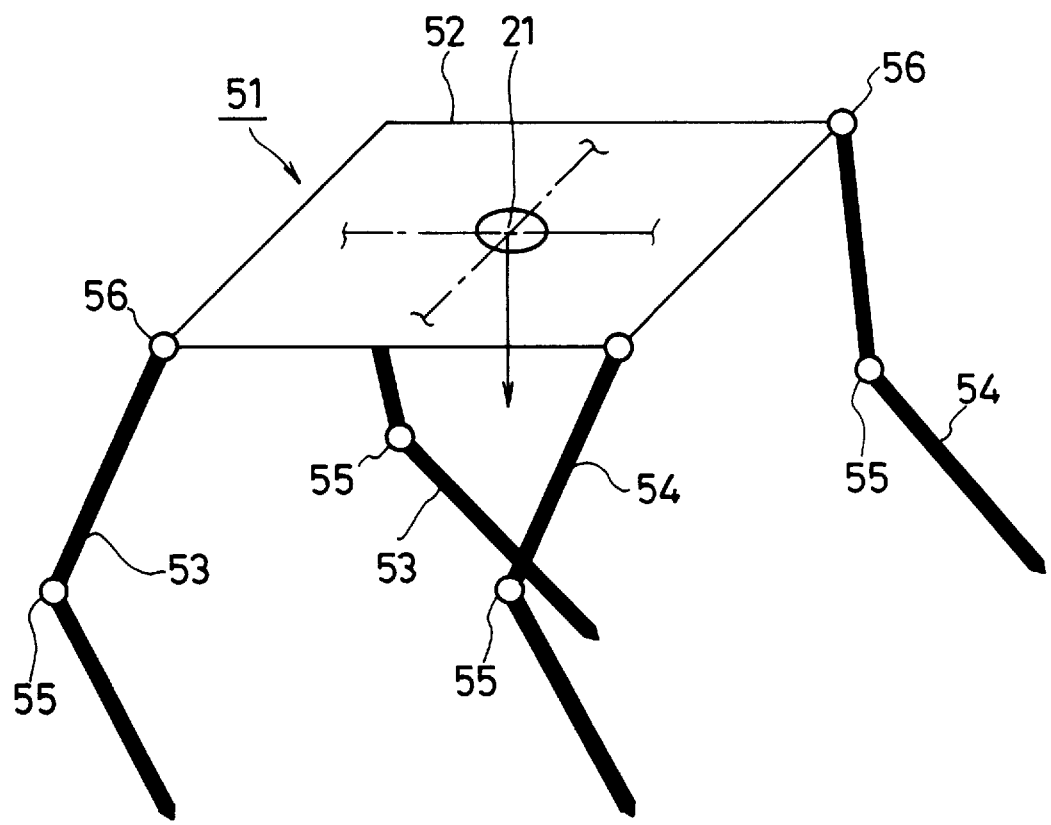
FIG. 9 is a perspective view showing the arrangement of a conventional multi-legged walking apparatus.

FIGS. 7 and 8 show another embodiment of the multi-legged walking apparatus of the invention. In this embodiment, the knee joints 6 of the front legs 3a and 3b are linear joints instead of rotary, and are driven by linear actuators 8. When front leg 3a or 3b changes to a swing leg, the leg is shortened by retracting the upper part of the lower link 5b into the knee joint 6, thereby bringing the ground contact member 7 off the ground to allow the leg to be swung. When front leg 3a or 3b changes to a support leg, the lower link 5b is extended back down from the knee joint 6 and locked, so the leg becomes rigid. The linear joint used may be constituted by a ball-and-screw mechanism, as one example. Since the linear movement is only effected by rotation of the ball-and-screw, a heavy weight can be constantly supported without locking the joint. In addition, rotating the ball-and-screw enables linear motion to be readily effected while the heavy weight is still being supported. The gear ratio (the amount of linear motion per rotation) can readily be set by cutting the thread at an appropriate pitch. With the thread formed on the upper part of the lower link 5b, the leg is extended or shortened by using a motor or the like to rotate the lower link 5b. When the motor is stopped, the links form a rigid bar. When extended, the leg supports the apparatus; when retracted, it becomes a swing leg. As in the first embodiment, back legs 4a and 4b have rotary actuators 16 to control the positions of the knee joints 14.

As described in the foregoing, in the multi-legged walking apparatus 1 according to this invention, the weight of the apparatus 1 is supported mainly by the front legs by positioning the weight and center of gravity of the apparatus above the front legs. When the front legs function as support legs the knees are locked, so no energy is expended. That is, the front legs only need actuators for controlling the knee joints, and do not need actuators for weight support functions. In a multi-legged walking apparatus almost none of the weight is on the back legs, so the back legs do not require apparatus weight support actuators either. Thus, actuators are only required for thrust purposes.

Although the invention has been described with reference to a four-legged walking apparatus, the invention is not limited to a four-legged configuration, being also applicable to a six-legged configuration. Such a six-legged apparatus would have four front legs and be configured so that the center of gravity of the apparatus is at the center of the four legs and thrust is provided by the remaining two back legs.

Thus, the multi-legged walking apparatus according to this invention does not need actuators to support the weight of the apparatus. As such, fewer actuators are required, and those that are required only need to be low-output types. As a result, the apparatus uses less energy and is economical to manufacture and operate.

What is claimed is:

1. A multi-legged walking apparatus comprising: a first plurality of legs having a large weight support capacity and a second plurality of legs providing a large thrust force, in which the first plurality of leg provides a smaller thrust force than the thrust force of the second plurality of legs and the second plurality of legs has a smaller weight support capacity than the weight support capacity of the first plurality of legs, overall apparatus weight is supported substantially by the first plurality of legs and overall and apparatus thrust is provided substantially by the second plurality of legs.

2. An apparatus according to claim 1, wherein a center of gravity of the apparatus is positioned above the first plurality of legs.

3. An apparatus according to claim 2 that further includes a counterbalance for adjusting a position of the center of gravity of the apparatus.

4. An apparatus according to claim 1, wherein the first plurality of legs are front legs and the second plurality of legs are back legs, and the front and back legs are each attached to an apparatus frame by a hip joint.

5. An apparatus according to claim 4, wherein each front leg is comprised by a lower link and an upper link connected by a knee joint.

6. An apparatus according to claim 5 that includes a rotary actuator with a brake on each knee joint for controlling a position of the knee joint.

7. An apparatus according to claim 5 that includes a linear actuator on each knee joint for controlling a front leg length.

8. An apparatus according to claim 4, wherein each back leg is comprised by a lower link and an upper link rotatably connected by a knee joint.

9. An apparatus according to claim 8 that includes a rotary actuator on each knee joint for generating a thrust force.

10. An apparatus according to claim 4 that includes a rotary actuator on each front leg hip joint for controlling a position of the hip joint.

11. An apparatus according to claim 4 that includes a rotary actuator on each back leg hip joint for generating a thrust force.

12. A multi-legged walking apparatus having front and back legs in which the front legs each have a weight support mechanism, the back legs each have an actuator for generating a thrust force, and a center of gravity of the apparatus is located more toward the front legs.

13. An apparatus according to claim 12 that further includes a counterbalance for adjusting the position of the center of gravity.

14. An apparatus according to claim 12, wherein the front legs are each attached to an apparatus frame by a hip joint.

15. An apparatus according to claim 12, wherein the back legs are each attached to an apparatus frame by a hip joint.

16. An apparatus according to claim 12, wherein each front leg is comprised by a lower link and an upper link rotatably connected by a knee joint.

17. An apparatus according to claim 16 that includes a rotary actuator with a brake on each knee joint for controlling a position of the knee joint.

18. An apparatus according to claim 16 that includes a linear actuator on each knee joint for controlling a front leg length.

19. An apparatus according to claim 12, wherein each back leg is comprised by a lower link and an upper link rotatably connected by a knee joint.

20. An apparatus according to claim 19 that includes a rotary actuator on each knee joint for generating a thrust force.

21. An apparatus according to claim 12, wherein the weight support mechanism is comprised by a knee joint having a rotary actuator with a brake for locking the upper and lower links comprising each front leg.

22. An apparatus according to claim 12, wherein the weight support mechanism is comprised by a knee joint having a linear actuator with a brake for locking the upper and lower links comprising each front leg.

23. An apparatus according to claim 14 that includes a rotary actuator on each front leg hip joint for controlling a position of the hip joint.

24. An apparatus according to claim 14 that includes a rotary actuator on each back leg hip joint for controlling a position of the hip joint.

* * * * *